UNITED STATES PATENT OFFICE.

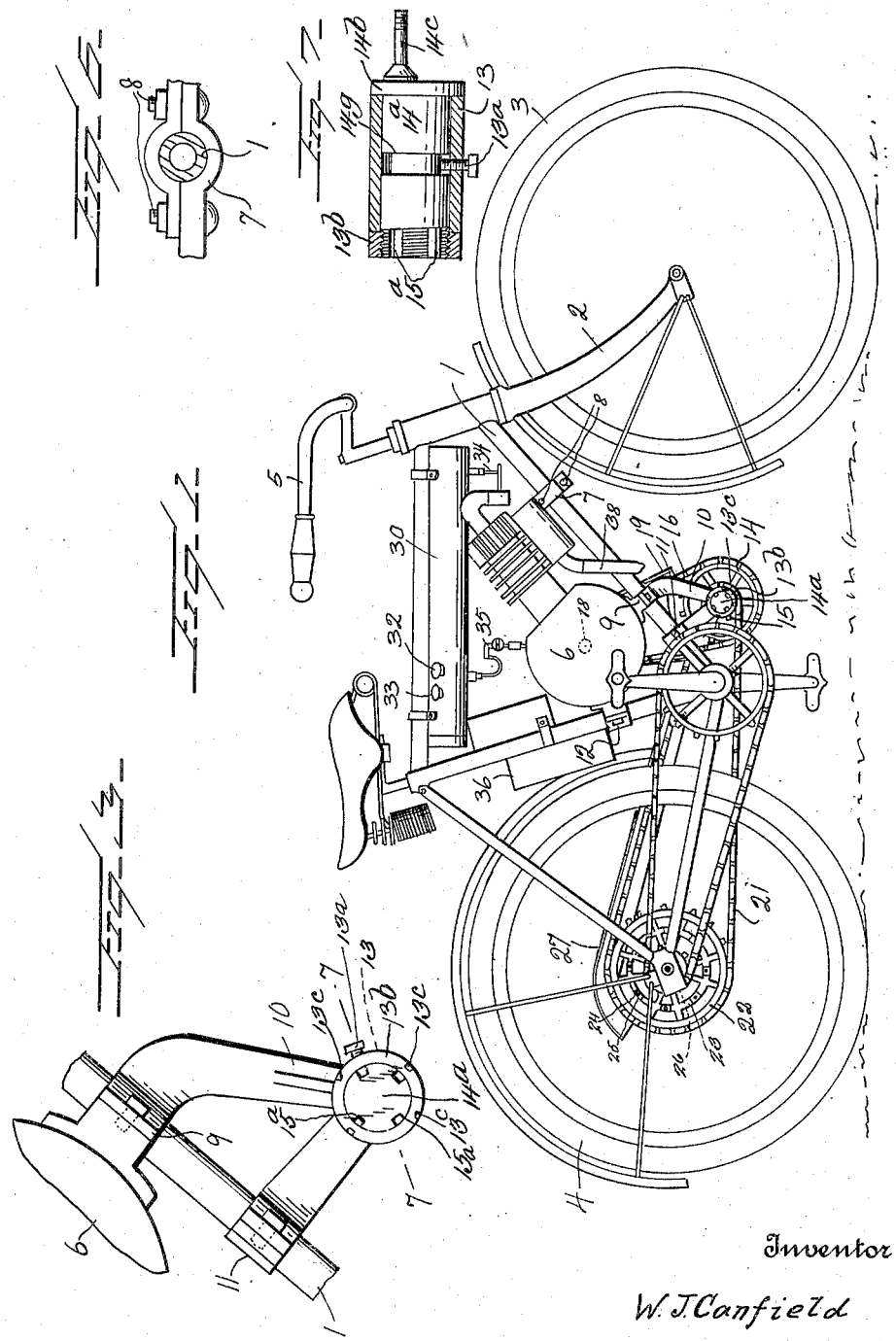

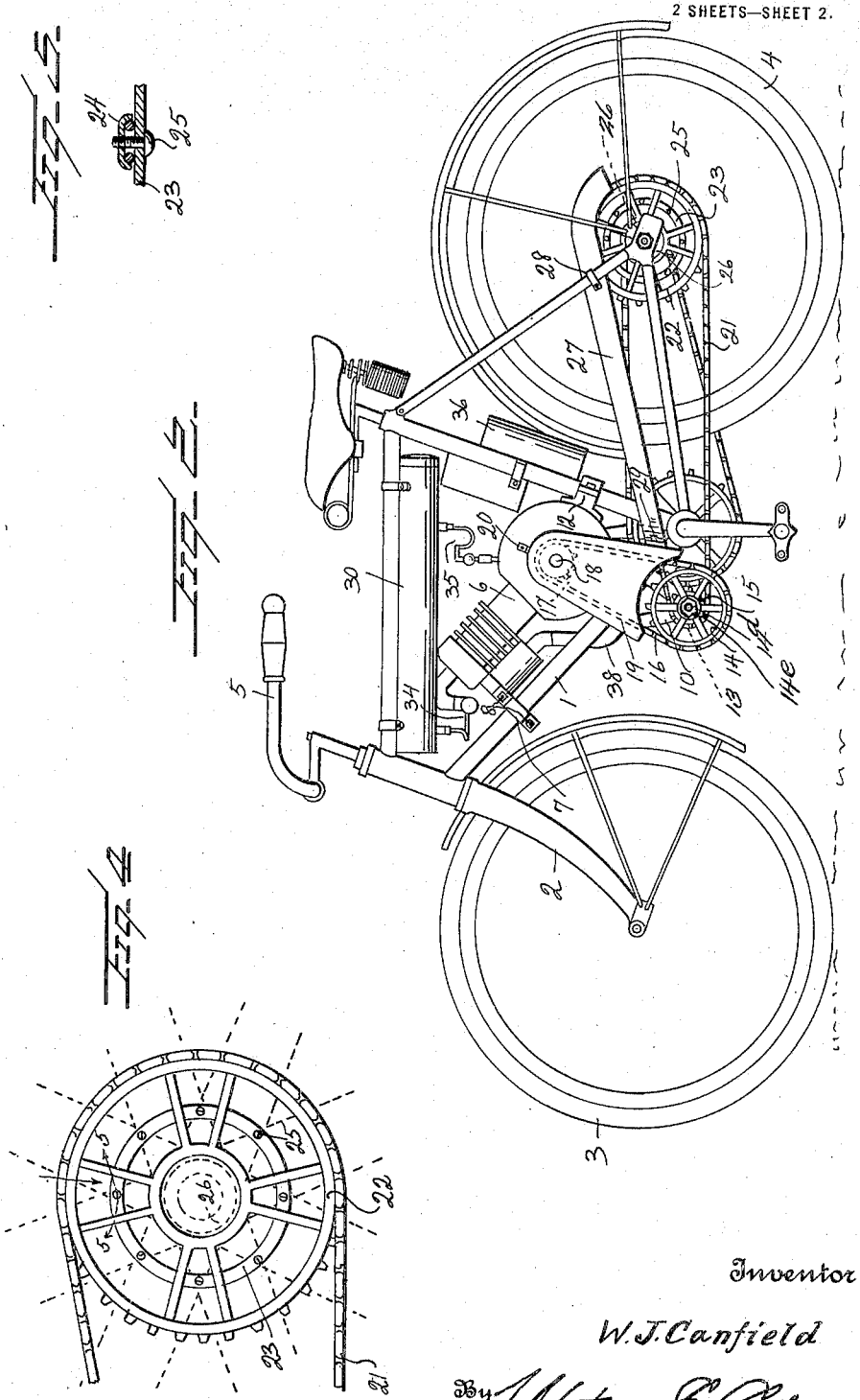

WILLIE J. CANFIELD, OF ESCATAWPA, MISSISSIPPI.

MOTORCYCLE.

1,321,978. Specification of Letters Patent. Patented Nov. 18, 1919.

Application filed June 4, 1919. Serial No. 301,616.

*To all whom it may concern:*

Be it known that I, WILLIE J. CANFIELD, a citizen of the United States, residing at Escatawpa, in the county of Jackson and State of Mississippi, have invented certain new and useful Improvements in Motorcycles, of which the following is a specification, reference being had to the accompanying drawings.

This invention relates to the art of motorcycles, and an object of the invention is the provision of a construction of motorcycle and attaching means therefor, whereby it can be applied to the frame of an ordinary bicycle, thereby converting a bicycle into a motorcycle, there being the usual means carried by the motorcycle handle bars (which are substituted for the usual bicycle handle bars) for controlling the motor.

The invention further aims to provide means for suitably attaching the motor rigidly and firmly on the frame of the bicycle.

The invention further aims to provide improved gear connections between the motor and the rear wheel of the bicycle, which, in the present instance as a design of the invention, is provided with a coaster brake, so that through the medium of gear connections between the motor and the rear wheel, power may be transmitted to the rear wheel, without operating the usual pedals of the bicycle.

The invention further aims to provide suitable means for guarding the chains of the gear connections between the rear wheel and the motor.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as hereinafter set forth, shown in the drawings and claimed.

In the drawings:

Figure 1 is a view in side elevation of a conventional form of bicycle, showing the motor as applied, and the means for attaching the motor to the frame, and illustrating the gear connections.

Fig. 2 is a view in elevation showing the opposite side of the bicycle and the application of the motor thereto, further illustrating the attaching means.

Fig. 3 is an enlarged detail view of a hanger frame which is applied to the frame of the bicycle, for partly supporting the motor, and partly supporting the gear connections between the motor and the rear wheel of the bicycle.

Fig. 4 is an enlarged detail view in side elevation of the rear sprocket of the rear wheel of the bicycle, to be operated by the gear connections with the motor.

Fig. 5 is a detail sectional view of the clamping means for clamping the sprocket detachably on the rear wheel of the bicycle.

Fig. 6 is a detail view of the clamp for attaching a part of the motor to the frame of the bicycle.

Fig. 7 is a detail sectional view on line 7—7 of Fig. 3, showing the eccentric mounting for the sprockets 14 and 15.

Referring more especially to the drawings, 1 designates the hanger frame of the bicycle, which is of the usual construction, 2 denotes the front forks, and 3 the front wheel and 4 the rear wheel, and 5 denote the handle bars, which are of the motorcycle type, in substitution for the usual bicycle handle bars.

A conventional form of motorcycle engine 6 is provided and carried by the top portion of the cylinder of the engine is a clamp 7, to engage the forward rearwardly and downwardly inclined bar of the hanger frame 1, there being a suitable tightening bolt 8 for securing the clamp in place.

By means of a clamp 9, a combined sprocket and motor supporting hanger frame 10 is clamped and also supported on the forward rearwardly and downwardly inclined bar or tube of the hanger frame 1. An additional clamp 11 is provided for additionally securing the frame 10 to the forward downwardly and rearwardly inclined rod or tube of the hanger frame 1. By means of an additional clamp 12 the motor is additionally secured to and clamped on the hanger frame, and rigidly relatively to the central brace bar of the hanger frame 1.

The sprocket hanger frame is provided with a suitable bearing 13 for the reception of a cylindrical axle or member $15^a$ provided with an integral flange $14^b$ at one end, which overlies one end of the bearing 13, to prevent movement of the axle or member 14 in one direction. Projecting eccentrically from one end of the axle or member 14 is a stub axle or projection 14ᶜ, on which the sprockets 14 and 15 are journaled, there being a suitable nut 14ᵈ and washer 14ᵉ on the stub axle, to retain the two sprockets in position. The axle or member 14ᵃ is provided with an annular groove or channel 14ᵍ, which is engaged by the end of a set screw 13ᵃ, which is threaded through the wall of the bearing 13. By tightening up on the set screw the axle or member 14ᵃ may be held in a rigid position, so as to support the sprockets, whereby the chains engaging the sprockets, may properly coöperate with the sprockets. The axle or member 14ᵃ has its other end threaded as shown, and engaging the threads is a ring 13ᵇ, to prevent the end movement of the axle or member 14ᵃ in the opposite direction. This ring or band 13ᵇ is provided with diametrically opposite notches 13ᶜ, to be engaged by a spanner wrench for screwing the band or ring home. The threaded end of the axle or member 14ᵃ is provided with diametrically opposite recesses or notches 15ᵃ, to also be engaged by a spanner wrench (not shown), whereby the axle or member 14ᵃ may be adjusted. By adjusting the axle or member 14ᵃ, it will be observed that an eccentrically mounted stub axle may be positioned, so as to tighten the sprocket chains, which coöperate or engage the sprockets 14 and 15. These sprockets 14 and 15 rotate as one body and engaging about the sprocket 14 is a sprocket chain 16, which in turn passes about the sprocket 17 of the crank shaft 18 of the explosive motor 6, which is of the conventional type.

A suitable chain guard or hood 19 is secured at 20 to the wall of the crank casing of the motor. Engaging about and being operated by the sprocket 15 is a sprocket chain 21, which travels about the sprocket 22, which is carried by and rotatable with the rear wheel 4 of the bicycle. By means of a circular clamping ring 23 (which is secured to the spokes of the rear wheel 4 of the bicycle, by means of the clamping plates and bolts 24 and 25), the sprocket 22 is revoluble with the rear wheel 4 of the bicycle. To convert a bicycle into a motorcycle as herein devised, a conventional form of coaster brake (not shown) may be carried at 26 in connection with the rear wheel 4 of the bicycle, so that the rear wheel may be operated by the motor, without imparting motion to the cranks and pedals of the bicycle. However, it is obvious that by operating the cranks and the pedals, motion will be imparted to the rear wheel of the bicycle, so that power may be transmitted through the medium of the chain 21, to the motor, for starting the same. A suitable guard or hood 27 is secured at 28 to the rear part of the hanger frame 1, and as at 29 to the hood or guard 18, for guarding the upper part of the sprocket chain 21.

The usual gasolene supply tank 30 is carried by the upper bar of the hanger frame 1, and is provided with the usual oil and gas cap controlled openings 32 and 33. This gasolene tank is provided with the usual feed connection 34 to the carbureter of the engine or motor. The tank 30 has a conventional form of oil feed connection 35 between it and the crank casing of the motor, for the purpose of lubricating the crank casing. In fact, the tank 30 has two compartments, one to contain lubricant, and the other to contain gasolene. A conventional form of ignition system which is indicated at 36 is carried by the upwardly inclined central bar of the hanger frame 1. The sprocket supporting hanger is provided with an eccentric chain tightener 37, for tightening the sprocket chain, between the motor and the sprocket 14, and between the sprocket 15 and the sprocket 22, whereby said chains may be tightened or loosened, as may be required. A conventional form of muffler 38 is carried by the motor, for connection to the exhaust manifold, for muffling utilized gases of the motor.

From the foregoing, it is obvious that there has been devised an improved construction of device, whereby a conventional form of bicycle can be converted into a motorcycle, by applying a conventional form of gasolene motor to the hanger frame of the bicycle.

The invention having been set forth, what is claimed as new and useful is:

1. In a device as set forth, the combination with a bicycle hanger frame provided with a rear drive wheel having a coaster brake, of an auxiliary gearing supporting frame, means for mounting said auxiliary frame on the hanger frame, a pair of sprockets mounted on the auxiliary frame, one having gear connections with the rear drive wheel of the bicycle, a motor on the hanger frame and having its crank shaft geared to the other sprocket, means for clamping the motor on the hanger frame, and guards for the gear connections between the sprockets and the crank shaft of the motor, and the gear connections between one of the sprockets and the rear drive wheel.

2. The combination with a bicycle including a hanger frame having a rear drive wheel, of an auxiliary gearing supporting frame including a pair of adjustable sprockets, means for clamping the auxiliary frame to the forwardly arranged rearwardly inclined bar of the hanger frame and depending diagonally downwardly therefrom, of a combustion motor having its crank shaft connected to one of the sprockets and being rigidly supported on the hanger frame, a rear sprocket having gear connections with the other sprocket of the auxiliary frame, means for clamping the rear sprocket to the spokes of the rear drive wheel of the bicycle, and guard means for the gear connections between the sprockets and the crank shaft and the rear sprocket.

3. The combination with a bicycle, including a hanger frame having a rear drive wheel, of an auxiliary gear supporting the frame including a pair of adjustable sprockets, means for clamping the auxiliary frame to the forwardly arranged but rearwardly inclined bar of the hanger frame, a combustion motor rigidly supported on the hanger frame and having its crank shaft connected to one of the sprockets, rear sprockets having gear connections with the other sprocket of the auxiliary frame, means for clamping the rear sprocket detachably to the spokes of the rear drive wheel of the bicycle, and pedally operated means geared to the rear drive wheel.

In testimony whereof I hereunto affix my signature in the presence of two witnesses.

WILLIE J. CANFIELD.

Witnesses:
F. S. McINNIS,
JOHN E. CANFIELD.